(12) United States Patent
Aranda et al.

(10) Patent No.: US 6,389,693 B1
(45) Date of Patent: May 21, 2002

(54) METHOD OF MAKING A CATALYTIC CONVERTER FOR USE IN AN INTERNAL COMBUSTION ENGINE

(75) Inventors: Douglas A. Aranda, Lindley; Thomas A. Collins, Horseheads; Paul S. Schmitt, Big Flats, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/209,998

(22) Filed: Dec. 11, 1998

Related U.S. Application Data (60) Provisional application No. 60/068,256, filed on Dec. 19, 1997.

(51) Int. Cl.⁷ .......................... B01D 53/34; B21D 51/16
(52) U.S. Cl. ...................... 29/890; 29/515; 29/407.05; 422/179; 422/180
(58) Field of Search .......................... 29/890, 515, 516, 29/890.09, 407.05; 422/179, 180, 170, 171, 177

(56) References Cited

U.S. PATENT DOCUMENTS

| | | |
|---|---|---|
| 4,347,219 A | 8/1982 | Noritake et al. |
| 4,969,264 A | 11/1990 | Dryer et al. |
| 4,969,265 A | 11/1990 | Ehara |
| 5,118,476 A | 6/1992 | Dryer et al. |
| 5,329,698 A | 7/1994 | Abbott |

FOREIGN PATENT DOCUMENTS

| | | |
|---|---|---|
| GB | 2 207 615 | 6/1991 |
| GB | 2 290 036 | 5/1995 |

*Primary Examiner*—David P. Bryant
(74) *Attorney, Agent, or Firm*—Timothy M. Schaeberle; Kees van der Sterre (57) ABSTRACT

Disclosed is a method of manufacturing a catalytic converter for purifying exhaust gases from an internal combustion engine wherein the converter exhibits a monolithic ceramic substrate surrounded by a supporting mat. The method generally includes the steps of: Forming a catalytic converter utilizing a compressive closing method generally involves wrapping the substrate in a sufficient amount of supporting mat material and inserting the wrapped substrate into generally cylindrical metal container, compressively closing the container around the wrapped substrate sufficiently to provide a gas tight seal and to hold the imparted compressive stress. The present invention further discloses an improvement involving compressively closing the container around the wrapped substrate by resizing the container over substantially the entire portion of its length which is occupied by the wrapped substrate to a predetermined metal shell/container outside diameter OD. The predetermined outside diameter is characterized by the equation $OD = D + 2T_1 + 2T_2$, wherein D is a diameter measure of the substrate, $T_1$ is the supporting mat target thickness and $T_2$ is a container wall thickness measure.

7 Claims, 6 Drawing Sheets

METHOD OF MAKING A CATALYTIC CONVERTER FOR USE IN AN INTERNAL COMBUSTION ENGINE

This application claims the benefit of U.S. Provisional Application No. 60/068,256, filed Dec. 19, 1997, entitled "METHOD OF MAKING A CATALYTIC CONVERTER FOR USE IN AN INTERNAL COMBUSTION ENGINE", by Douglas A. Aranda and Paul S. Schmitt.

BACKGROUND OF THE INVENTION

1. Field of the Invention

The invention relates to a process for the production of catalytic converters for purifying exhaust gases, and more particularly to a method for producing catalytic converters exhibiting uniform mat densities, which is insensitive to substrate, supporting mat and metal shell variation.

2. Description of the Related Art

As is well known, the purification of exhaust gases from internal combustion engines, particularly in motor vehicles, is generally achieved by an exhaust gas purification system in which a ceramic element having a honeycomb cell structure acts as a catalyst carrier. More precisely, this honeycomb cell structure is covered with a catalyst that contains a precious metal which functions, in the presence of $O_2$, to convert noxious components of the exhaust gas, such as HC and CO, to $CO_2$ and $H_2O$. The honeycomb cell structure is housed within a gas-tight, sheet metal or cast-metal heat resistant housing or can.

Honeycomb structures currently employed are typically comprised of a ceramic material such as cordierite; a brittle material exhibiting limited mechanical strength. The successful and practical use of these honeycomb ceramics as a catalytic converter substrates requires that the ceramic monolith be compressively held in a surrounding metal can, with Type 409 stainless steel being preferred. Additionally, catalytic converters in use today, typically include wrapping the monolith with a flexible, high temperature mat material and then enclosing it, utilizing one of several methods, within the metal can. In other words, the metal can is closed on the wrapped ceramic which combines with the cushioning mat to compressively load the substrate. The flexibility of the mat allows the supporting system to accommodate the irregular shape of the ceramic monolith and produce a continuous supporting system. The wrapped substrate protects against axial movement by the frictional component of the compressive pressure exerted by the can through the mat. It is held in place against radial movement by the compressed bulk of the mat. One typically sees that the axial holding power of the can/mat combination is a key measure of the suitability of the system design in an environment of high temperatures and mechanical vibration.

Within the field of exhaust systems, there are two major positions where the catalytic converter can be located. In a majority of automotive four-stroke engine applications, the converter is positioned downstream of the engine exhaust manifold as a stand-alone component. In this case, the shell of the converter is surrounded by ambient air. As such, the free moving air cools the exterior of the converter resulting in the exterior portion of the catalytic converter exhibiting a temperature significantly below the range of 500 to 650° C., while at the same time the ceramic substrate experiences temperatures ranging from 800 to 950° C. Since the temperatures to which the can is exposed to remain below 650° C., a vermiculite-based intumescent mat, which generally expands as the temperature rises, is sufficient. This counteracts the loosening effect of the can's expansion away from the ceramic. On the other hand, in a minority of automotive applications, the converter is placed very close to the engine manifold, where the temperatures on the mat generally exceed the generally accepted 650° C. limit of vermiculite materials. In these applications, non-intumescent mat materials are generally preferred.

In another large class of vehicles, notably motorcycles and motor scooters, the converter is most often located within the muffler. Space is at a premium on motorcycles and scooters, and the catalytic converter is designed into the vehicle without changing the external conformance of the bike; this is true for both 2-stroke and 4-stroke engines. The thermal and mechanical conditions for these applications are more severe than for the above auto configurations as temperatures typically exceed 750° C. or above. Pressure waves and vibration from the engine exhaust valving are more extreme. Engine rpm is higher than seen in autos; this creates a higher frequency vibrational environment. The 2-stroke exhaust waves are particularly severe since the exhaust valving occurs in the power stroke and is overlapped with the intake at the end of the piston downstroke. Further, the external surface of the motorbike shell is typically surrounded by hot engine exhaust within the muffler rather than a cooling ambient air stream such as seen in automotive installations. It follows that vermiculite based mat systems are unacceptable, and a non-intumescent vermiculite-free mat composition is needed. In sum, design of the motorcycle catalytic converter is made more difficult because temperatures are higher and expansion of the metal shell container cannot be counteracted by an intumescent material, as well as because of the fact that the vibration/shock effects are more severe.

Ceramic fiber mats, capable of exposure to temperatures as high as ~1200° C., represent an alternative to intumescents. The force generated by these mats is developed completely from the compression it undergoes during the canning of the catalytic converter. As such, the form of canning is critical to these fiber-based mats.

Stuff mounting is one method of canning that has been utilized in the past. Initially, the substrate is wrapped with the mat and inserted into a conical device that compresses the mat as it is pushed through. The wrapped substrate is then ejected from the compression cone into a cylindrical tube that serves as the converter container or shell. In the process of performing this activity, the mat must be maintained within a very narrow dimensional gap (high gap bulk density) between the can and the substrate. A major problem of this stuff mounting method is the inability of the process to compensate for variabilities in the mat basis weight, substrate diameter and in the metal shell container diameter. Even if the variabilities could be compensated or overcome, current techniques for stuff mounting these fiber based mats, at such high gap bulk densities, are, at best, inefficient processes.

Tourniquet style canning techniques have been developed which are capable of compensating for mat, substrate and container/can variability; i.e., techniques which allow the center region of the can to vary about nominal as the mat weight basis and ceramic diameter vary. For example, see U.S. patent application Ser. No. 09/130,172, which discloses a method for producing the catalytic converter which involves compressively closing the metal shell container around the supporting mat-wrapped honeycomb substrate using an optimized mat density. As disclosed, the tourniquet strap force produces a consistent and optimized pressure upon the mat, thereby allowing the resulting final can diameter to increase and decrease as the ceramic diameter and mat weight basis varies; i.e., the constant canning force achieves consistent mat pressure and variations in can wall thickness, substrate diameter and mat weight result in very small changes in this mat pressure. In other words, mat pressure is maintained at an optimum range without individual measurements of the components. Although this technique is effective for achieving larger automotive diameter catalytic converters exhibiting a mat compression of sufficient uniformity, difficulties arise for smaller motorcycle-size diameter catalytic converters where the force required for the tourniquet to bend the container wall (as opposed to compressing the mat) is a significant portion of the overall closure forces. Furthermore, uniformity suffers, especially at the tourniquet lap where a double thickness of can causes the can to be less flexible resulting in a flatter can curvature and localized increases in the mat density. As such, even though this tourniquet process produces small motorcycle catalytic converters exhibiting sufficient overall mat compression uniformity, a process is needed which is less complicated and is less labor intensive; i.e., a process which eliminates the need for welding to fix the container to the desired mat compression.

As such there remains a need for, and it is thus an objective of this invention to provide, for a simpler, less labor-intensive, more efficient canning process which achieves a uniform mat density, uniform compression on the ceramic substrate, in a manner such that the average mat density of a particular assembly is insensitive to variations in the average value of incoming parts, including the weight basis of the supporting mat, the diameter of the ceramic substrate and the thickness of the metal container.

SUMMARY OF THE INVENTION

It is therefore an objective of the present invention to disclose a formation method that overcomes the problems and shortcomings of the current compressive closing methods for forming catalytic converters. In other words, the present invention discloses a method of forming catalytic converters which achieves a compressive load upon the honeycomb structure which is sufficient to retain, but not damage the retained honeycomb substrate, and which is relatively insensitive to variations in supporting mat weight basis, ceramic substrate diameter and metal container thickness.

Forming a catalytic converter utilizing a compressive closing method generally involves wrapping the substrate in a sufficient amount of supporting mat material and inserting the wrapped substrate into a generally cylindrical metal container and thereafter compressively closing the container around the wrapped substrate sufficiently to provide a gas tight seal.

The present invention provides an improved method for forming a catalytic converter involving compressively closing the container around the wrapped substrate by resizing the container over substantially the entire portion of its length which is occupied by the wrapped substrate to a predetermined metal container outside diameter OD. The predetermined metal container outside diameter is characterized by the equation $OD=D+2T_1+2T_2$, wherein D is a diameter measure D of the substrate, $T_1$ is the supporting mat target thickness and $T_2$ is a container wall thickness measure.

DETAILED DESCRIPTION OF THE INVENTION

The present invention relates to a process of forming catalytic converters, and more particularly to a method of forming catalytic converters which achieves a uniform compressive load upon the honeycomb structure which is sufficient to retain, but not damage the retained honeycomb substrate, and which is relatively insensitive to variations in supporting mat weight basis, ceramic substrate diameter and metal shell/container thickness. A typical process for forming catalytic converters comprises wrapping the substrate in a sufficient amount of supporting mat material and inserting the wrapped substrate into a generally cylindrical metal container, compressively closing the container around the wrapped substrate to provide a gas tight seal and to hold the compressive stress.

The present invention more particularly relates to an improvement in the above-described process which comprises resizing the container over substantially the entire portion of its length which is occupied by the wrapped substrate to a predetermined container outside diameter OD, wherein the predetermined outside final or resized diameter is characterized by the equation $OD=D+2T_1+2T_2$, wherein D is a diameter measure D of the substrate, $T_1$ is the supporting mat target thickness and $T_2$ is a container wall thickness measure.

Ceramic honeycomb substrate suitable for use in the present invention may be formed from any ceramic material conventionally used for this purpose such as is disclosed, for example in U.S. Pat. No. 3,885,977 or U.S. Pat. Reissue No. 27,747. Preferably, an extruded cordierite ceramic substrate having a high mechanical integrity, low resistance to gas flow and a high geometric surface area is utilized as the substrate. One important parameter for the ceramic substrate is its mechanical integrity, in particular its radial strength. Typical cordierite honeycomb substrates are capable of easily withstanding more than 4826.5 kPa (700 psi) of radial pressure before noticeable damage to the honeycomb occurs. Ceramic honeycomb typically comprises square cells, although the cells of the honeycomb may have shapes other than square, including triangular, rectangular and the like.

Mat material suitable for use in the present invention comprise a formed ceramic fiber material, a simple non-expanding ceramic material. Acceptable non-expanding ceramic fiber material include ceramic materials such as those sold under the trademarks "NEXTEL" and "SAFFIL" by the "3M" Company, Minneapolis, Minn. or those sold under the trademarks "CC-MAX"and "FIBERMAX" by the Unifrax Co., Niagara Falls, N.Y.

Suitable materials for the metal shell 16 comprise any material which is capable of resisting under-car salt, temperature and corrosion; ferritic stainless steels including grades SS-409, SS-439, and more recently SS-441 are however, generally preferred. The choice of material depends on the type of gas, the maximum temperature and the like.

Figure 1:
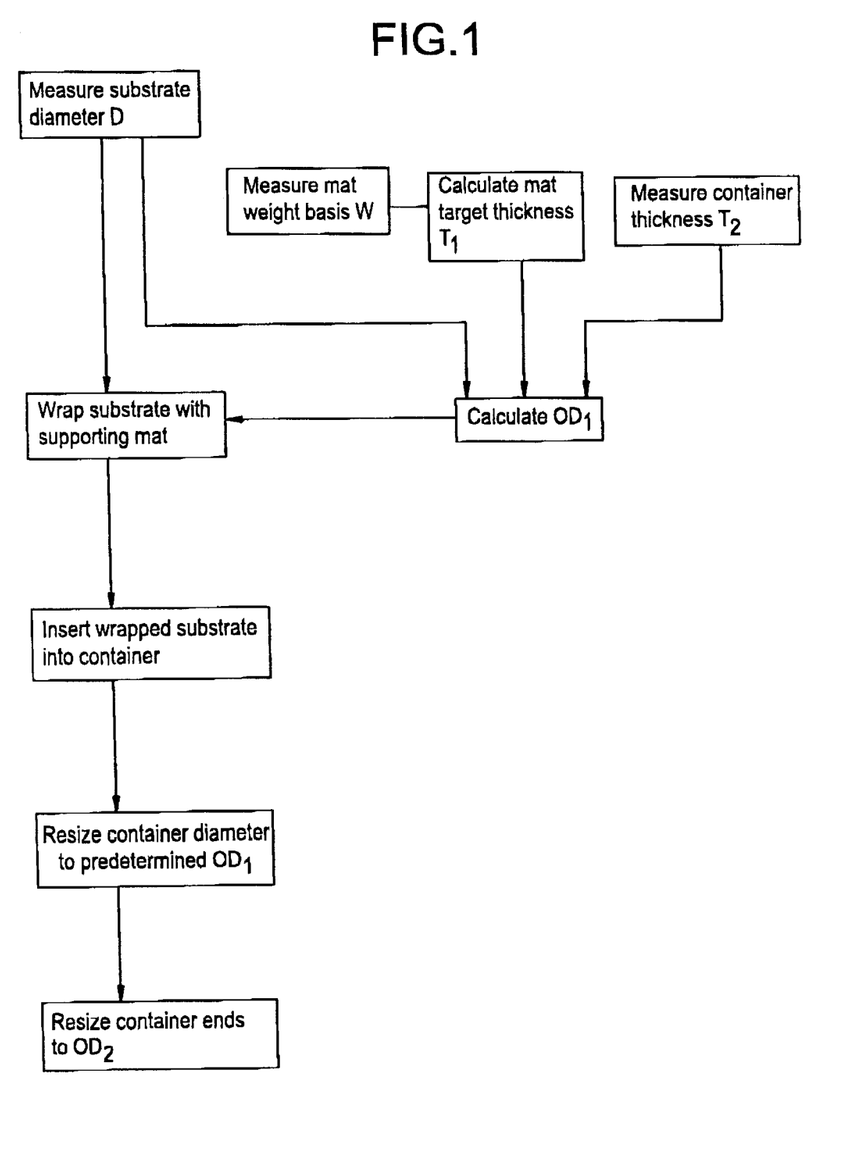
FIG. 1 is a flow diagram illustrating the process of manufacturing catalytic converters for purifying exhaust gas according to the invention.

Referring now to FIG. 1 illustrated is a flow chart which generally details the improved method of manufacturing a catalytic converter for purifying exhaust gases from an internal combustion engine. The method in greater detail is as follows:

Firstly, the diameter D of the ceramic substrate is measured; preferably the diameter value (D) is an average value of at least two diameter measurements (eight being preferred), including at least measures of the maximum and minimum diameter of the substrate. Next, the weight basis (WB) of the supporting mat material is calculated and is obtained by a direct measurement of the weight (M) and dividing it by the measured area (A) of the supporting mat material; specifically, WB=M/A. Since the area of diecut mat varies very little (2% or less) from mat piece to mat piece, the weight of an individual mat is adequate to calculate the actual weight basis in grams per square meter for the particular piece of mat used in a particular assembly. From this weight basis value the supporting mat target thickness ($T_1$) is calculated. Specifically, the target thickness ($T_1$) is determined by following formula $T_1$=WB/δ; wherein δ is the desired compressed target density value which is determined beforehand; see for instance U.S. patent application Ser. No. 09/130,172 (Schmitt et al.), hereinafter incorporated by reference, for a technique for determining this target density. Next, the wall thickness ($T_2$) of the generally cylindrical container, preferably tubular in configuration, is measured by direct measurement; preferably this wall thickness measure ($T_2$) is the average thickness (statistically representative value) of the container (statistically representative value). The final calculation step involves calculating a container outside or resized diameter OD based on the data determined above; specifically, the predetermined container diameter is determined by the equation OD=D+2$T_1$+2$T_2$.

An example calculation for the canning of a 35 mm diameter by 75 mm long substrate that is to be canned to a desired average mat density of 0.55 g/cc would be as follows:
A diecut supporting mat comprised of the aforementioned "CC-MAX" ceramic material, was measured to exhibit a 68.5 mm width, a 135 mm length, a weight of 18.96 g and was thereafter calculated to have an area (A) of 9.25×10$^{-3}$ m$^2$; i.e., 0.0685 m×0.135 m=9.25×10$^{-3}$ m$^2$. As such, the weight basis (WB) was calculated to be the following: WB=M/A=18.96 g/9.25×10$^{-3}$ m$^2$=2049.7 g/m$^2$. Given the aforementioned target supporting mat density (δ) of 0.55 g/cc, the supporting mat target thickness ($T_1$) was calculated to be 3.73 mm; $T_1$=0.001 (WB/δ)=0.001(2049.7 g/m$^2$/0.55 g/cc)=3.73 mm. Given a measured actual average can wall thickness ($T_2$) of 1.223 mm and an actual measured and calculated average substrate diameter (D) of 35.24 mm, the OD was calculated to be 45.146 mm; OD=D+2$T_1$+2$T_2$= 35.24 mm+2(3.73 mm)+2(1.223 mm)=45.146 mm.

Figure 2:
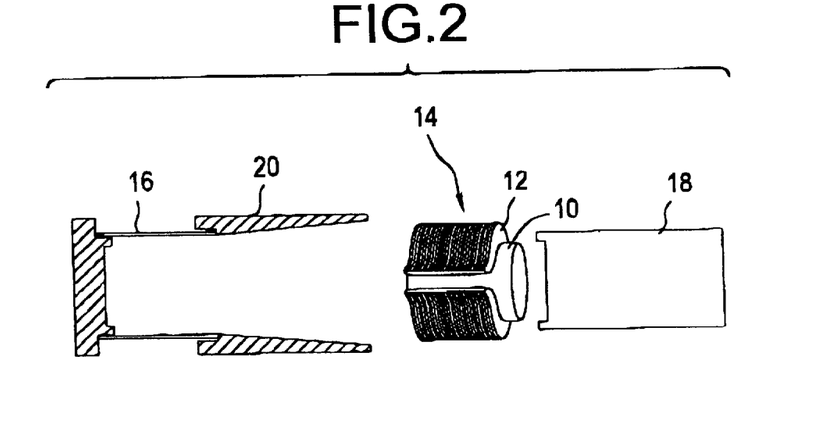
FIGS. 2–4 illustrate various stages of insertion for use in the instant method of forming a catalytic converter.
Figure 3:
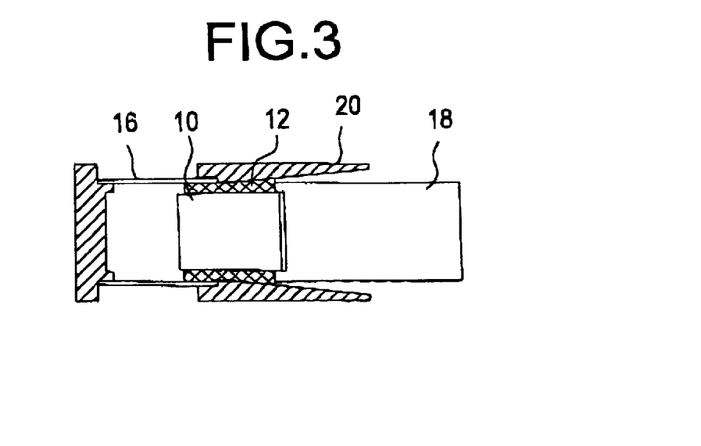
Figure 4:
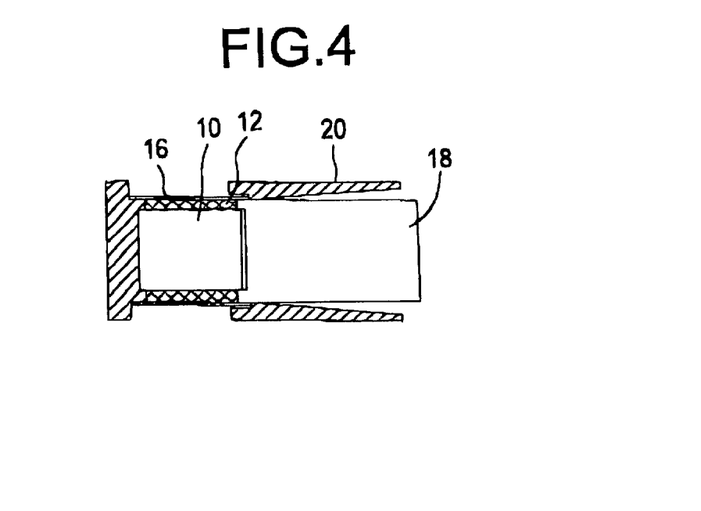

Once the generally cylindrical container outside or resized diameter OD is calculated the actual catalytic converter is assembled; FIGS. 2–4 illustrate the sequence of an embodiment of the insertion steps for assembling the catalytic converter. In general, the method first involves wrapping the substrate 10 in a sufficient amount of supporting mat material 12 and thereafter inserting the wrapped substrate 14 into the generally cylindrical container 16. In a preferred embodiment, the mat is of length such that the ends of the substrate are exposed and the can length is such that it is slightly longer than the substrate length. Specifically, the wrapped substrate 14 is inserted (i.e., soft stuffed) into the generally cylindrical container 16 by utilizing a plunger 18 and forcing the wrapped substrate 14 through a tapered stuffing cone 20 and into the generally cylindrical can 16. Container 16 is configured to have a diameter that is larger than the final resized diameter; the container is sized as such so that the mat when soft. stuffed into the can, the mat suffers minimal damage as a result of this soft stuffing or insertion step. For example, for the above calculation that is based on a 0.55 g/cc target mat density for the CC-MAX material, values of between 0.30 to 0.35 g/cc would be used as the target soft stuff density. This enables consistent placement of the mat in proper position without damage to the supporting mat which is likely when stuffed to higher densities, such as, for example, about 0.40 g/cc.

Figure 5:
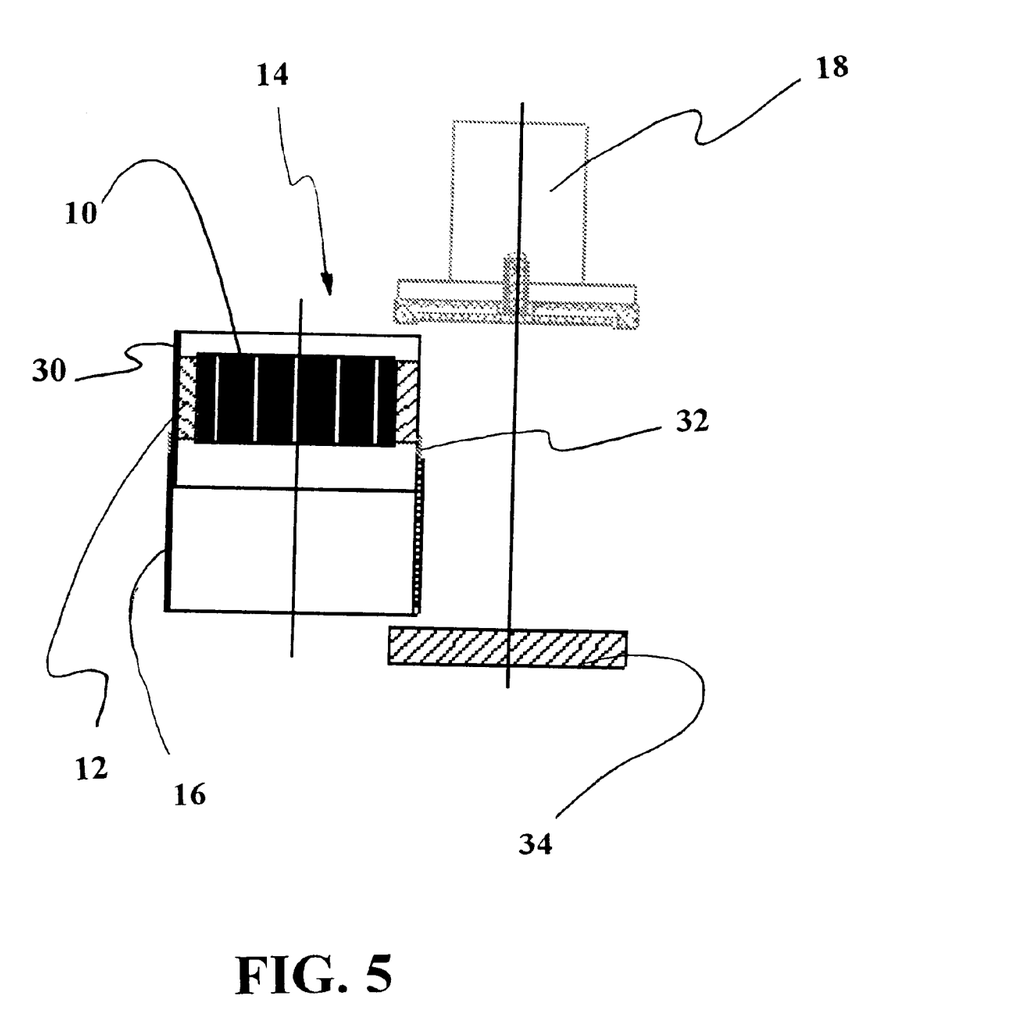
FIGS. 5–7 illustrate the various stages of an alternative means of insertion for use in the instant invention.
Figure 6:
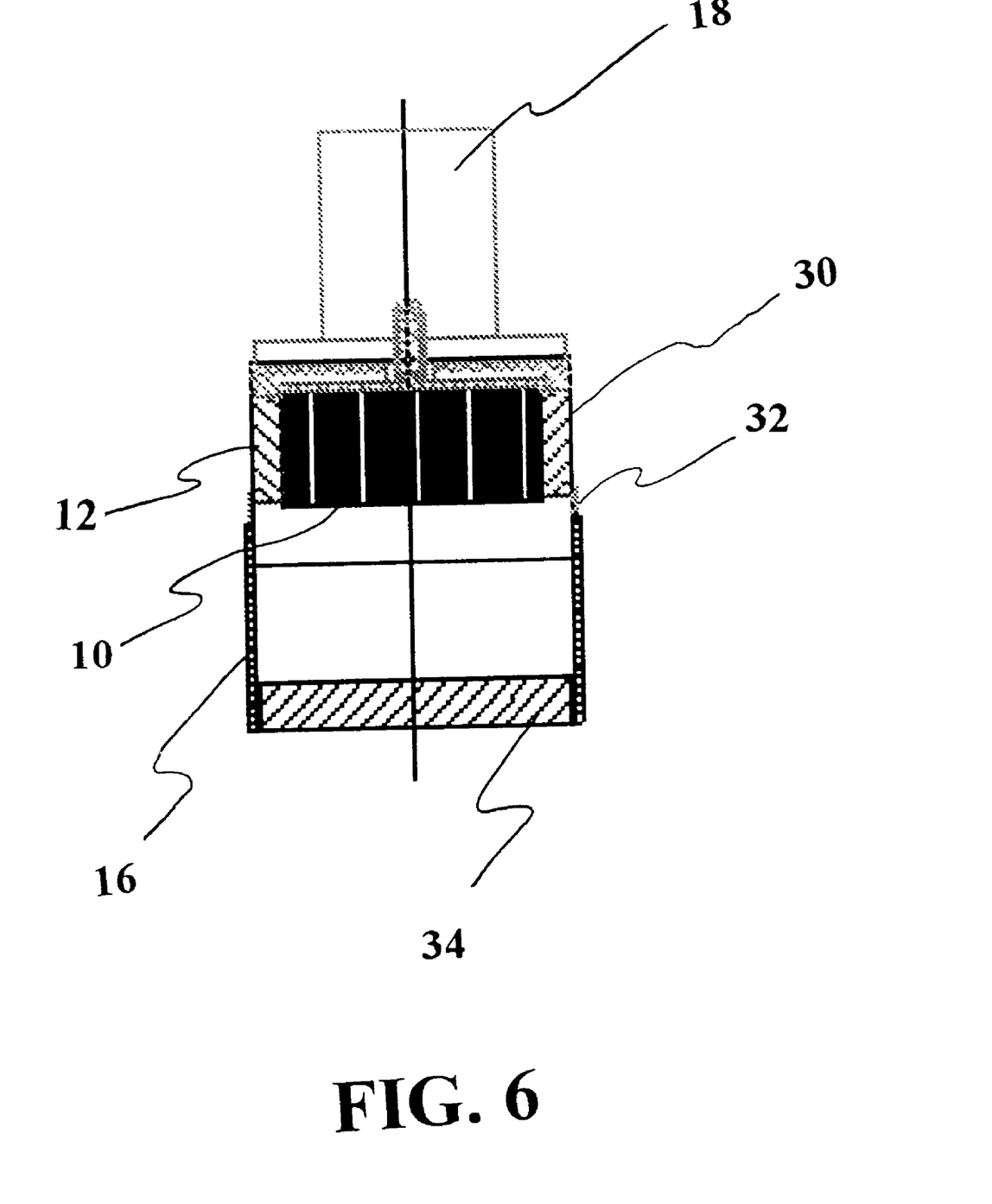
Figure 7:
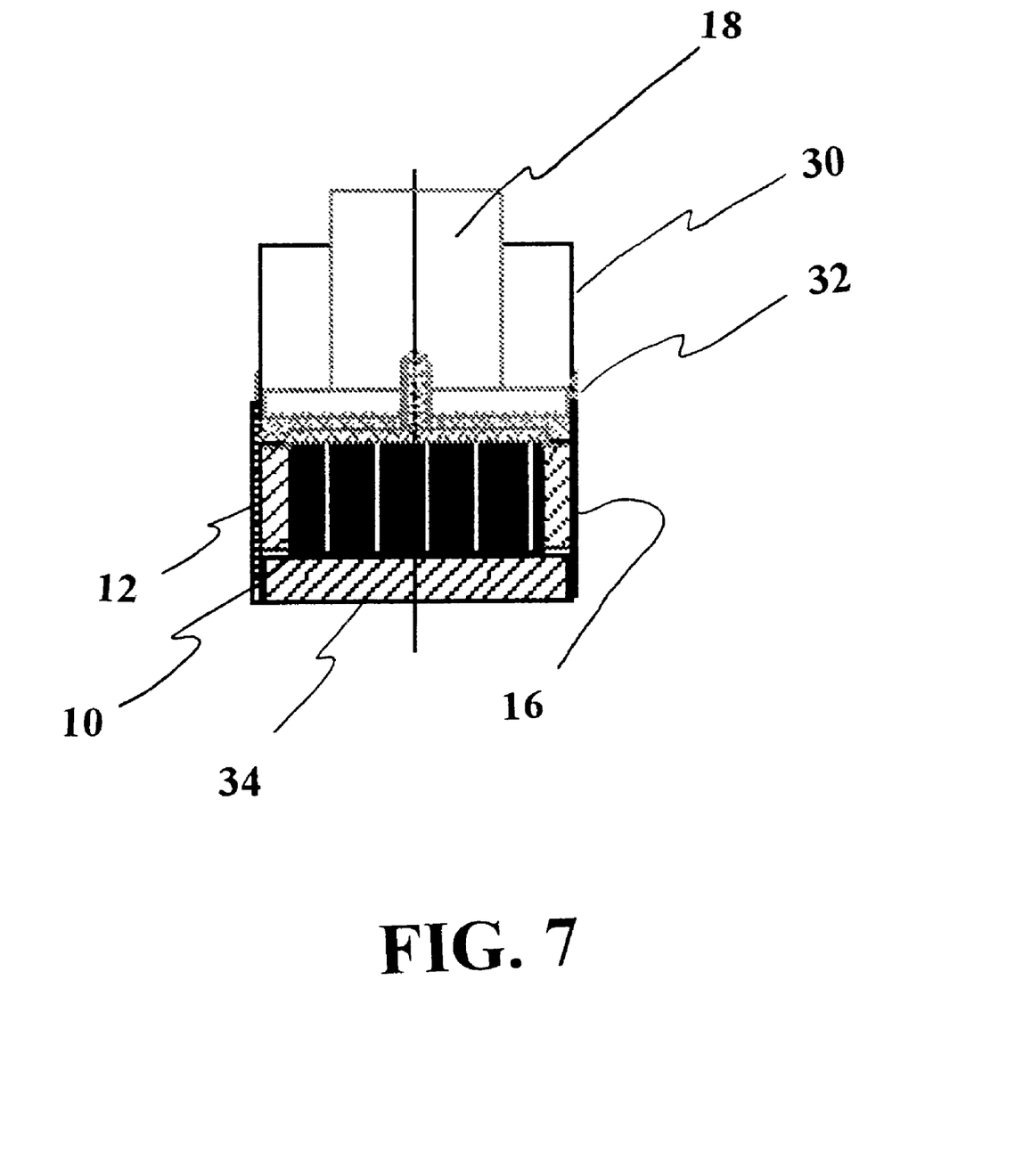

FIGS. 5–7 illustrate the sequence of an alternative embodiment of the insertion steps for assembling the catalytic converter. As before, the method generally involves wrapping the substrate 10 in a sufficient amount of supporting mat material 12 and thereafter inserting the wrapped substrate into the generally cylindrical container. As in the previous embodiment, the mat is preferably of length such that the ends of the substrate are exposed and the can's length is such that it is slightly longer than the substrate length. In this alternative insertion embodiment, however the wrapped substrate 14 is first inserted into an intermediate cylindrical insertion container 32 having a diameter larger than the wrapped substrate. The insertion container 32, having the wrapped mat 14 inserted therein, is thereafter radially compressed to a diameter that is slightly smaller than the generally cylindrical container's 16 diameter; suitable methods for radially compressing the insertion container and wrapped substrate include tourniquet style compression techniques, as well as, simple techniques utilizing a compression strap wrench. While maintaining the compression on the insertion container 32, one end of the insertion container can 32 is inserted into the cylindrical container 16. In order to limit how far the insertion 20 can is able to be inserted into the generally cylindrical can 16, the outside surface of the insertion can be provided with tabs 32 which come into contact with the end of the generally cylindrical can 16. The wrapped substrate is thereafter forced, via a plunger 18, through the intermediate insertion can 20 and into the generally cylindrical can 16. As the wrapped substrate is pushed out of the insertion can and into the generally cylindrical can the mat of the wrapped substrate expands to fill the generally cylindrical container 16. The wrapped substrate is inserted into the cylindrical can 20 until it is in the desired proper position. This proper positioning can be ensured by simply inserting a stopper 34 into the end of the cylindrical can and inserting the wrapped substrate until it comes into contact with the stopper which functions to prevent the insertion container from being inserted any farther into the cylindrical container. Once the wrapped substrate is within the can in the proper position the insertion container 32 can thereafter be removed. As in the previous embodiment container 16 is configured to have a diameter which is larger than the final resized diameter; the container is sized as such so that the mat when soft stuffed into the can, the mat suffers minimal damage as a result of this soft stuffing or insertion step.

Either of the two aforementioned insertion methods can be utilized in the instant invention, however the second, alternative insertion method is preferred because it results in less stress being placed upon mat during the compression of the mat. In the alternative insertion method, the only stress that the mat is subject to is that due to the radial compression of the mat. In the preceding insertion method using a tapered stuffing cone, the mat is subject to a combination of stresses including the shear stresses resulting from the axial displacement of the mat in the tapered cone plus the radial compression on the mat resulting from the reduction in diameter as the mat is translated axially. The use of the first insertion method as part of the inventive method of manufacturing a catalytic converter results in a more uniform compressive load on the substrate than prior art methods, however, when compared to the utilization of the alternative insertion method, the first insertion method's combined effect of axial movement in the taper plus the mat compression can slightly damage the mat and shift its position rearward so that the mat is not as uniformly positioned along the cylindrical length of the substrate.

Following insertion into the container, the method next involves compressively closing the container around the wrapped substrate by resizing the container over substantially the entire portion of its length which is occupied by the wrapped substrate to the predetermined container outside final/resized diameter OD.

Figure 8:
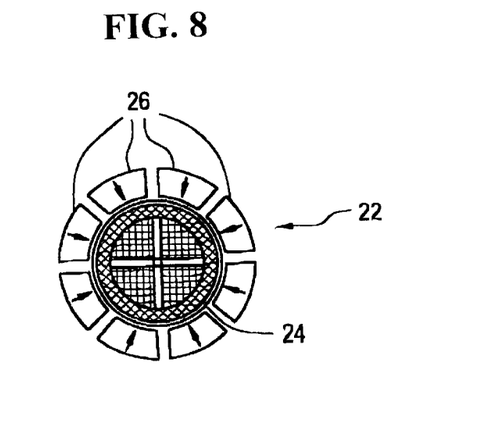
FIG. 8 and 9 illustrate end views of stages of the resizing step of the instant method of forming a catalytic converter.
Figure 9:
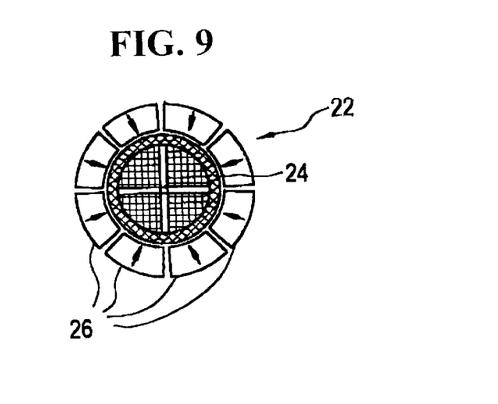
Figure 10:
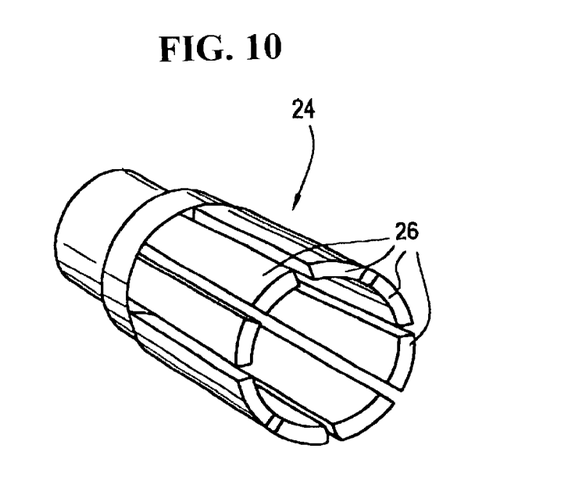
FIG. 10 illustrates a perspective view of a resizing die useful in the present invention.

FIGS. 8 and 9 illustrate the various stages of the resizing to a predetermined or final diameter. The "soft stuffed" catalytic converter 22 is resized by placing it into a resizing die 24 (see FIG. 10 for a perspective view of the die 24) having a plurality of fingers 26 extending axially along substantially the entire surface of the container and by thereafter displacing the fingers 22 radially inward (arrows indicating direction) until substantially the entire portion of the container length which is occupied by the wrapped substrate is sized to the predetermined container resized diameter.

There are several acceptable means for achieving the radial and inward compression of the resizing die, including hydraulic, mechanical or electrical means. It is within the knowledge of those skilled in the art to determine which method is best and most efficient.

In a preferred embodiment, a calculation would be performed for each separate catalytic converter assembly prior to soft stuffing or insertion and the process automated as follows. First, the diameter data D is fed to a computer as the first data used to calculate final container resized diameter OD. The diecut mat weight W and area A are fed into the same computer which then calculates the exact weight basis WB and the thickness $T_1$ using the aforementioned formulas. Furthermore, the average wall thickness $T_2$ of the container data is fed to the computer. With these three inputs, the computer calculates the container OD for a target mat density, again utilizing the aforementioned OD=D+2$T_1$+2$T_2$ formula. Once the computer calculates the container target diameter OD, it is then converted to a instruction tag (for example, a barcode sticker) which is to then to be placed on the assembly. The mat is then wrapped onto its substrate and stuffed into container at a target (soft) density. This "soft stuffed" assembly, instruction tag having been attached to the assembly, is placed into a queue for the digital resizing machine. There, the computer numerical control resizer reads the instruction tag to determine the target or final resized OD, internally adjusts its controls automatically and executes the resizing operation to compress the container to the target final resized diameter, thus achieving the desired compressed mat density. After full length resizing, the ends of the container are resized to the fixed end diameter required to facilitate uniform assembly within a muffler.

In sum, what is described herein is a method for forming a catalytic converter involving the soft stuff and resizing of a ceramic substrate mount to a uniform mat density in a manner such that the average mat density of a particular assembly is insensitive to variation in the average value of incoming parts. The present method utilizes a high enough compressive resizing force so as to produce a catalytic converter having a supporting mat which exhibits a sufficient retentive force to maintain the substrate in place, yet the method utilizes a low enough compressive force so as not to damage mat supporting material. Furthermore, the compressive force is sufficient to result in a supporting mat that is dense enough to resist gas erosion. In addition, this catalytic converter formation method allows for both variability in the substrate geometry and the properties exhibited by the supporting mat. Specifically, this method is capable of compensating for substrate diameters that are variable within current manufacturing tolerances, as well as supporting mat materials having a variable weight basis and generally cylindrical metal containers having variable wall thicknesses. In other words, this method, regardless of the geometry of the finished honeycomb ceramic part and the supporting mat material property variability, produces catalytic converters wherein the retentive frictional force remains consistent and uniform.

Although the invention has been described in detail for the purpose of illustration, it is understood that such detail is solely for that purpose, and variations can be made therein by those skilled in the art without departing from the spirit and intended scope which is defined by the following claims.

We claim:

1. A method of manufacturing a series of separate catalytic converters for purifying exhaust gases from an internal combustion engine, each converter comprising a monolithic ceramic substrate having a generally cylindrical surface surrounded by a supporting mat and being disposed in a generally cylindrical container, the method comprising the steps of:

(a) measuring the diameter D of a first ceramic substrate;

(b) calculating a container outside diameter OD from the equation OD=D+2$T_1$+2$T_2$, wherein D is a measured diameter of the substrate, $T_1$ is a target thickness for the supporting mat, and $T_2$ is a container wall thickness measure, $T_1$ being calculated from the equation $T_1$=WB/$\delta$ wherein WB is the weight basis of the supporting mat material and $\delta$ is the target mat density of the supporting mat material;

(c) wrapping the cylindrical surface of the first ceramic substrate in a sufficient amount of supporting mat material to form a wrapped substrate and inserting the wrapped substrate into the generally cylindrical container;

(d) compressively closing the container around the wrapped substrate by resizing the container over substantially the entire portion of its length that is occupied by the wrapped substrate to the predetermined container outside diameter OD, and thereafter, (e) repeating steps a–d for each successive and separate catalytic converter.

2. The method of claim 1 wherein the diameter value D comprises an average of at least two diameter measurements including the maximum and minimum diameters of the substrate.

3. The method of claim 1 wherein the container wall thickness measure $T_2$ is an average thickness of the container.

4. The method of claim 1 wherein the generally cylindrical container comprises a tubular container.

5. The method of claim 1 wherein the container is resized by placing the container in a resizing die having a plurality of fingers extending axially along substantially the entire surface of the container and by thereafter displacing the fingers radially inward.

6. The method of claim 5 further involving resizing the end portion of the container to second smaller outside diameter.

7. A method of manufacturing a series of separate catalytic converters for purifying exhaust gases from an internal combustion engine, each converter comprising a monolithic ceramic substrate having a generally cylindrical surface surrounded by a supporting mat and being disposed within a generally cylindrical container, the method comprising the steps of:

(a) measuring the diameter D of a first ceramic substrate;

(b) calculating a container outside diameter OD, wherein the predetermined metal shell outside diameter is characterized by the equation $OD=D+2T_1+2T_2$, wherein D is a diameter measure D of the substrate, $T_1$ is the supporting mat target thickness, and $T_2$ is a container wall thickness measure;

(c) wrapping the cylindrical surface of the first ceramic substrate in a sufficient amount of supporting mat material to form a wrapped substrate;

(d) inserting the wrapped substrate into an intermediate insertion container having a diameter larger than the wrapped substrate;

(e) radially compressing and holding the insertion container and inserted wrapped substrate to a diameter which is smaller than the generally cylindrical container;

(f) inserting an end of the intermediate insertion container into the generally cylindrical container and thereafter forcing the wrapped substrate out of the insertion container and into the generally cylindrical container until the wrapped substrate is entirely within the generally cylindrical container in the proper position;

(g) removing the intermediate insertion container from within the generally cylindrical container;

(h) compressively closing the generally cylindrical container around the wrapped substrate by resizing the container over substantially the entire portion of its length that is occupied by the wrapped substrate to the predetermined container outside diameter OD; and thereafter, (i) repeating steps (a)–(h) for each successive and separate catalytic converter.

* * * * *